US012429005B2

(12) United States Patent
Gerstner et al.

(10) Patent No.: US 12,429,005 B2
(45) Date of Patent: Sep. 30, 2025

(54) SYSTEMS AND METHODS FOR PROVIDING A DIESEL-METHANOL EMULSION FOR DIRECT INJECTION ENGINES

(71) Applicant: Caterpillar Inc., Peoria, IL (US)

(72) Inventors: Michael David Gerstner, Peoria, IL (US); Daniel Raymond Baldwin, Mossville, IL (US); Robert Graumüller, Kiel (DE); Eric Lee Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 89 days.

(21) Appl. No.: 18/466,066

(22) Filed: Sep. 13, 2023

(65) Prior Publication Data

US 2025/0084800 A1 Mar. 13, 2025

(51) Int. Cl.
*F02D 19/06* (2006.01)

(52) U.S. Cl.
CPC ....... *F02D 19/061* (2013.01); *F02D 19/0613* (2013.01)

(58) Field of Classification Search
CPC ........................... F02D 19/061; F02D 19/0613
See application file for complete search history.

(56) References Cited

U.S. PATENT DOCUMENTS 4,499,862 A 2/1985 Baumer et al.
5,560,344 A 10/1996 Chan
9,765,707 B2 * 9/2017 Krug .................. F02D 19/0628
11,300,083 B1 * 4/2022 Dudar ................ F02M 37/0088
2009/0320786 A1 * 12/2009 Fisher ................ F02M 21/0287 123/304
2009/0320789 A1 * 12/2009 Lund ................... F02D 19/0665 123/299
2010/0024789 A1 * 2/2010 Lippa .................. F02D 19/0665 123/577

(Continued)

FOREIGN PATENT DOCUMENTS

CN 2903450 5/2007
CN 103821649 A 5/2014

(Continued)

OTHER PUBLICATIONS

Written Opinion and International Search Report for Int'l. Patent Appln. No.PCT/US2024/042010, mailed Oct. 9, 2024 (11 pgs).

*Primary Examiner* — Long T Tran
(74) *Attorney, Agent, or Firm* — Lee & Hayes, PLLC

(57) ABSTRACT

An internal combustion engine system is described herein. The system uses a mixer to mix two fuels to provide for a transition from using only one of the fuels to using only the other fuel as power demand changes. The output of the mixer is provided to the engine as a primary fuel. A controller opens and closes throttle valves to adjust the relative concentrations of a first fuel (e.g., diesel) and a second fuel (e.g., methanol) that enter the mixer. In some examples, rather than removing the desired performance and/or environmental benefits achieved by using the second fuel at power demand levels greater than the maximum achievable by only using the second fuel, the systems described herein allow the use of at least a portion of the second fuel in the primary fuel at those power demand levels.

20 Claims, 7 Drawing Sheets

(56) References Cited

U.S. PATENT DOCUMENTS

| | | | | |
|---|---|---|---|---|
| 2010/0264162 | A1* | 10/2010 | Cratensburg | B67D 7/04 222/129 |
| 2011/0168137 | A1* | 7/2011 | Yagi | F02D 19/0652 123/510 |
| 2013/0036990 | A1* | 2/2013 | Chishima | F02M 31/20 123/3 |
| 2013/0125867 | A1* | 5/2013 | Krug | F02D 19/0642 123/575 |
| 2014/0041642 | A1* | 2/2014 | Tsutsumi | F02M 31/20 123/541 |
| 2015/0275816 | A1* | 10/2015 | Pursifull | F02D 41/08 123/456 |
| 2016/0084172 | A1* | 3/2016 | Ten Broeke | F02D 19/0628 123/468 |
| 2016/0097349 | A1 | 4/2016 | Tokumaru | |
| 2017/0241351 | A1* | 8/2017 | Kurotani | F02D 19/081 |
| 2021/0156321 | A1 | 5/2021 | Yao et al. | |

FOREIGN PATENT DOCUMENTS

| | | | |
|---|---|---|---|
| CN | 203809177 | U | 9/2014 |
| CN | 109026409 | A | 12/2018 |
| DE | 19609800 | C1 | 11/1996 |
| DE | 102008043930 | A1 | 6/2010 |
| GB | 1593852 | | 7/1981 |

* cited by examiner

SYSTEMS AND METHODS FOR PROVIDING A DIESEL-METHANOL EMULSION FOR DIRECT INJECTION ENGINES

TECHNICAL FIELD

The present disclosure relates generally to operating a prime mover, and more particularly, to using an emulsion to provide for a transitional power band between a primary methanol operation to a primary diesel operation of the prime mover.

BACKGROUND

Work machine prime movers, such as internal combustion engines, fuel cells, batteries, and the like, are widely used in various industries. Internal combustion engines, for example, can operate using a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. Further, in pilot-ignited applications, including dual fuel applications, a mixture of a gaseous fuel, such as natural gas and air, is delivered into a cylinder and ignition is triggered using a relatively small direct injection of a compression ignition fuel (e.g., pilot fuel) which autoignites to trigger ignition of the relatively larger main charge.

As part of the effort to improve the efficiency of these engines, researchers have explored various types of alternate fuel mixtures, including alcohol fuels like methanol, ethanol, and other chemicals such as formaldehyde. In some examples, methanol is directly injected into an engine cylinder and the methanol is ignited with a pilot fuel or a spark. The use of methanol can provide various benefits over other alternative fuels. For example, methanol has relatively low production costs and can be less expensive to produce relative to other alternative fuels. Further, the availability of methanol can be greater than other sources of alternate fuels because methanol can be produced in a variety of ways using materials ranging from natural gas to coal. Additionally, methanol is relatively safe to use, store, and transport because methanol has a relatively low risk of flammability. As mentioned above, a pilot fuel may be needed to assist in the ignition of the methanol. Diesel fuel is often used as the pilot fuel to ignite the low cetane methanol fuel for methanol powered engines. Typically, diesel fuel, as the pilot fuel, will be injected into a combustion chamber prior to the injection of the methanol fuel. The ignition of the diesel (or pilot fuel) causes the ignition of the methanol fuel.

In some instances, the use of both diesel and methanol in an engine may be desirable. Some efforts have been made to provide methanol and/or diesel in varying amount based on the condition of the engine (i.e., startup) or the power level. For example, U.S. Pat. No. 4,499,862 to Baumer et. al ("the '862 patent") describes a direct injection system configured to operate using diesel and alcohol fuels. The system of the '862 patent describes the use of a different valve for the diesel fuel and alcohol fuel, whereby the time in which each one is open can be adjusted based on power requirements. However, the system described in the '862 patent has some deficiencies. For example, the system of the '862 patent injects the methanol into the combustion cylinder, meaning that the immersion and mixing of the methanol with the diesel fuel relies solely on the turbulent air flow within the relatively small volume of space in the cylinder, which may result in incomplete mixing. The potential incomplete mixing can result in a reduced total power available when in the diesel-methanol mode. Additionally, because the methanol portion of the system of the '862 patent is to inject only methanol, there can exist a power band gap between using primarily ethanol as the first fuel and using diesel as the first fuel.

Examples of the present disclosure are directed to overcoming deficiencies of such systems.

SUMMARY

In an aspect of the presently disclosed subject matter, a system includes an engine that combusts a primary fuel and a pilot fuel, wherein the engine is an internal combustion engine, a first fuel tank for storing a first fuel, a second fuel tank for storing a second fuel, a first fuel metering valve for controlling a first fuel flowrate of the first fuel through a tee, wherein an output of the tee flows into a mixer, a second fuel metering valve for controlling a second fuel flowrate of the second fuel through the tee, and the mixer for mixing the output of the tee, wherein a mixer output of the mixer flows into a primary fuel rail for use by the engine as the primary fuel, wherein a position of the first fuel metering valve and a position of the second fuel metering valve determines a concentration of the first fuel and a concentration of the second fuel in the primary fuel.

In an additional aspect of the presently disclosed subject matter, a method includes monitoring, by a controller, the system, the system comprising an internal combustion engine that combusts a primary fuel and a pilot fuel, a first fuel tank for storing a first fuel, a second fuel tank for storing a second fuel, a first fuel metering valve for controlling a first fuel flowrate of the first fuel through a tee, wherein an output of a tee flows into a mixer, a second fuel metering valve for controlling a second fuel flowrate of the second fuel through the tee, and the mixer for mixing the output of the tee, wherein a mixer output of the mixer flows into a primary fuel rail for use by the engine as the primary fuel, wherein a position of the first fuel metering valve and a position of the second fuel metering valve determines a concentration of the first fuel and a concentration of the second fuel in the primary fuel, and receiving, by the controller, a power demand input, retrieving, by the controller, a first fuel flowrate and retrieving a second fuel flowrate from an engine map based on the power demand input, issuing, by the controller, a first fuel control signal to the first fuel metering valve to cause the first fuel metering valve to adjust to a first fuel metering valve position to achieve the first fuel flowrate, and issuing, by the controller, a second fuel control signal to the second fuel metering valve to cause the second fuel metering valve to adjust a second fuel metering valve position to the position based on the second fuel control signal.

In a still further aspect of the presently disclosed subject matter, a controller includes a memory storing computer-executable instructions and a processor in communication with the memory, the computer-executable instructions causing the processor to perform acts comprising monitoring, a system, the system comprising an internal combustion engine that combusts a primary fuel and a pilot fuel, first fuel tank for storing a first fuel, a second fuel tank for storing a second fuel, a first fuel metering valve for controlling a first fuel flowrate of the first fuel through a tee, wherein an output of a tee flows into a mixer, a second fuel metering valve for controlling a second fuel flowrate of the second fuel through the tee, and the mixer for mixing the output of the tee, wherein a mixer output of the mixer flows into a primary fuel rail for use by the engine as the primary fuel, wherein a position of the first fuel metering valve and a position of the second fuel metering valve determines a concentration of the first fuel and a concentration of the second fuel in the primary fuel, and receiving a power demand input: retrieving a first fuel flowrate and retrieving a second fuel flowrate from an engine map based on the power demand input, issuing a first fuel control signal to the first fuel metering valve to cause the first fuel metering valve to adjust to a first fuel metering valve position to achieve the first fuel flowrate, and issuing a second fuel control signal to the second fuel metering valve to cause the second fuel metering valve to adjust a second fuel metering valve position to the position based on the second fuel control signal.

DETAILED DESCRIPTION

Figure 1:
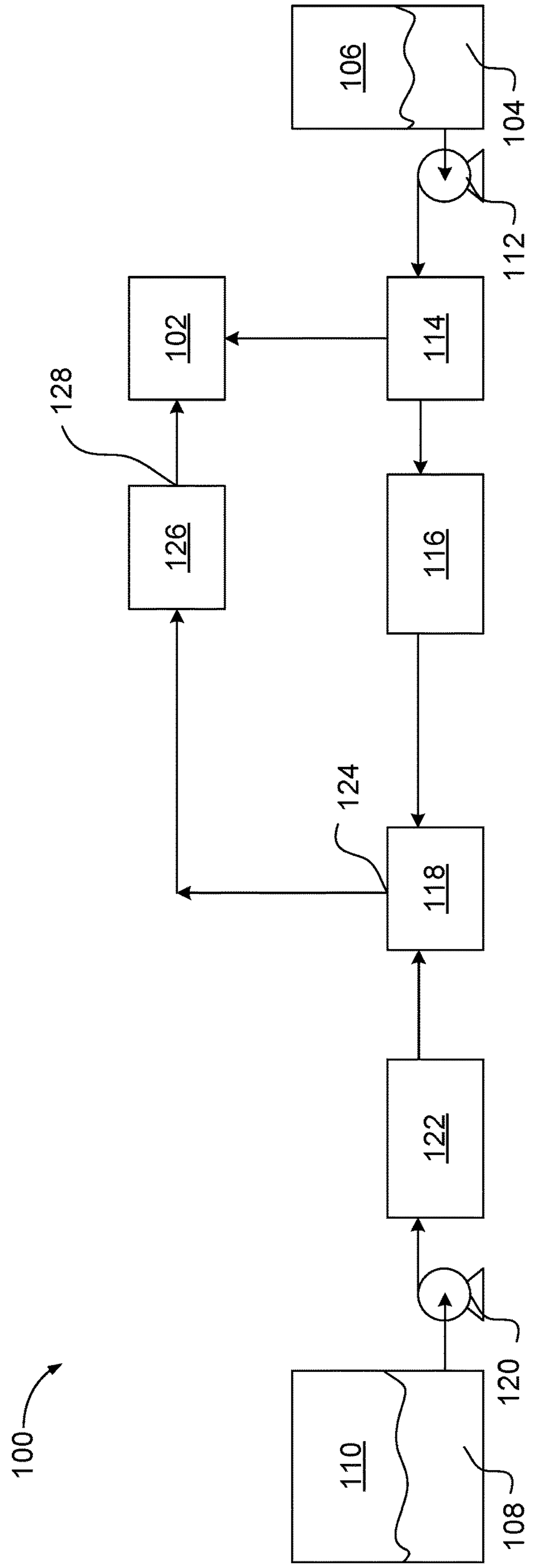
FIG. 1 is a schematic illustration of a combustion engine system that uses a mixer to mix a fuel into another fuel fed into an engine as a primary fuel, in accordance with one or more examples of the present disclosure.

Wherever possible, the same reference numbers will be used throughout the drawings to refer to same or like parts. Referring to the figures, FIG. 1 is a schematic illustration of a combustion engine system 100 that uses a mixer to mix a fuel into another fuel fed into an engine, in accordance with one or more examples of the present disclosure. The system 100 includes an engine 102, which is an internal combustion engine. As used herein, the engine 102 is a type of prime mover that may be used separately from, or in conjunction with, other systems such as batteries, fuel cells, and the like. The engine 102 is fueled by a first fuel 104 stored in a first fuel tank 106 and/or a second fuel 108 stored in a second fuel tank 110. The first fuel 104 may include a higher cetane/lower octane liquid fuel, and the second fuel 108 may include a lower cetane/higher octane liquid fuel. The terms "higher" and "lower" in this context may be understood as relative terms in relation to one another. Thus, the first fuel 104 may have a higher cetane number and a lower octane number than a cetane number and an octane number of the second fuel 108. The first fuel 104 might include a diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The second fuel 108 may include an alcohol fuel such as methanol or ethanol, Naphtha, for example, or still other fuel types. For the purposes of FIG. 1, the first fuel 104 is described as diesel fuel and the second fuel 108 is described as methanol, though as noted above, the presently disclosed subject matter may be used with other fuel types.

In some examples, the first fuel 104 may be used as a pilot fuel to the engine 102. A pilot fuel is a fuel injected before or in conjunction with a second fuel. In the example in FIG. 1, compression from a piston (not shown) of the engine 102 is used to ignite the first fuel 104, which ignites due to a relatively higher cetane number than other fuels. The relatively higher temperatures created during the ignition and combustion of the first fuel 104 when used as a pilot fuel then provide a sufficient pressure and temperature to combust the second fuel 108, which may not readily compressively ignite due to a relatively lower cetane number than the first fuel 104. The first fuel 104 is in fluidic communication with and is pumped by a first fuel pump 112 into block 114 and into one or more injectors (not shown) of the engine 102. The block 114 is generally a ported device that receives the first fuel 104 from the pump 112 and directs the first fuel 104 into the engine as the pilot fuel or to a first fuel metering valve 116 if the first fuel metering valve 116 is open, allowing fluid flow of the first fuel 104. The first fuel metering valve 116 prevents and throttles the flow of the first fuel 104 into a tee 118.

A second fuel pump 120 is in fluidic communication with the second fuel 108 in the second fuel tank 110. The second fuel pump 120 pumps the second fuel 108 from the second fuel tank 110 into a second fuel metering valve 122. The second fuel metering valve 122 prevents and throttles the flow of the second fuel 108 into the tee 118. One or more fluids entering the tee 118 exit tee outlet 124 and enters a mixer 126. The mixer 126 is designed to mix fluids entering the mixer 126 to create an emulsification of fluids entering the mixer 126. Depending on the volumetric flowrate of the one or more fluids entering the mixer 126, the mixer can be a low-shear/high-flow mixer or a high-shear/low-flow mixer. In some examples, the mixer 126 is a liquid-liquid mixer, a gas-liquid mixer, or multiple combinations thereof. However, it should be noted that the presently disclosed subject matter is not limited to any particular type or number of mixers, as more than one type, different types, or multiple mixers may be used and are considered to be within the scope of the presently disclosed subject matter.

When the second fuel 108 is used as a primary fuel, an output 128 of the mixer 126 is primarily the second fuel 108. The second fuel pump 120 pumps the second fuel 108 from the second fuel tank 110. The second fuel metering valve 122 can be a proportional or throttle valve that changes the flowrate of the second fuel 108 into the tee 118 based on the position of the second fuel metering valve 122. In the configuration in which the second fuel 108 is the primary fuel, the tee outlet 124 of the tee 118 is the second fuel 108 because the first fuel metering valve 116 is closed, abating the flow of the first fuel 104 from the first fuel pump 112 out of the block 114 at the first fuel metering valve 116. The first fuel 104 flows out of the first fuel pump 112 through the block 114 and into the engine 102 as a pilot fuel. When the first fuel 104 is used as a primary fuel, the output 128 of the mixer 126 is primarily the first fuel 104. The first fuel pump 112 pumps the first fuel 104 from the first fuel tank 106. The first fuel metering valve 116 is a proportional or throttle valve that changes the flowrate of the first fuel 104 into the tee 118 based on the position of the first fuel metering valve 116. In this example, because the first fuel 104 is being used as the primary fuel, the tee outlet 124 of the tee 118 is the first fuel 104 because the second fuel metering valve 122 is closed, abating the flow of the second fuel 108 from the second fuel pump 120 at the second fuel metering valve 122. In some examples where the first fuel 104 is used as the primary fuel, along with closing the second fuel metering valve 122, the second fuel pump 120 may also be deenergized.

Along with the configurations in which the second fuel 108 or the first fuel 104 is used as the primary fuel, the system 100 further includes a configuration in which the primary fuel may be a mixture (or emulsion) of the first fuel 104 and the second fuel 108. In these examples, as the engine power demand increases where the engine 102 transitions from the use of the second fuel 108 as the only primary fuel to the first fuel 104 as the only primary fuel, the first fuel 104 and the second fuel 108 may be mixed in various concentrations as the engine 102 moves through and back from the transition. For the configuration where the engine 102 transitions from the use of the second fuel 108 as the only primary fuel to the first fuel 104 as the only primary fuel, initially the first fuel metering valve 116 is closed and the second fuel metering valve 122 is throttled to control the volumetric flowrate of the second fuel 108 into the tee 118, the mixer 126, and eventually the engine 102 as the primary fuel.

To increase the amount of the first fuel 104 added to the primary fuel, the first fuel metering valve 116 is throttled open based on the desired amount of the first fuel 104 to be added as a constituent to the primary fuel. The first fuel pump 112 pumps the first fuel 104 into the block, where a portion continues to be used as the pilot fuel. A second portion exits the block 114 and flows through the first fuel metering valve 116 at a volumetric flowrate set by the position of the first fuel metering valve 116, which as explained above, is a throttle valve. It should be understood that the use of a throttle valve is merely for purposes of providing an example, as other technologies for controlling the volumetric flowrate of the first fuel 104, including variable speed pumps, may be used and are considered to be within the scope of the presently disclosed subject matter. The first fuel 104 and the second fuel 108 enter the tee 118, exit at the tee outlet 124, and thereafter, enter the mixer 126 where the two fuels are mixed. Depending on the type of fuels used, the mixtures can be solutions, suspensions, or colloids, and may be homogeneous or heterogeneous. The presently disclosed subject matter is not limited to any particular type of mixture. In the example in which the first fuel 104 is diesel (oil) and the second fuel 108 is methanol, the mixture may be an emulsion, a type of colloid, because the methanol and diesel are almost non-miscible. The mixer 126 mixes the first fuel 104 and the second fuel 108 prior to the engine 102. As noted above, the mixer 126 may have various forms of construction. The concentrations of the first fuel 104 and the second fuel 108 in the primary fuel are determined by the positions of the first fuel metering valve 116 and the second fuel metering valve 122.

To increase the relative concentration of the first fuel 104 to the second fuel 108, meaning the engine 102 is transitioning from a methanol-only primary fuel mode towards a diesel-only primary fuel mode, the first fuel metering valve 116 is opened further while the second fuel metering valve 122 is closed further. The process continues until the first fuel metering valve 116 is opened while the second fuel metering valve 122 is closed, thereby abating the flow of the second fuel 108. To decrease the relative concentration of the first fuel 104 to the second fuel 108, meaning the engine 102 is transitioning from a diesel-only primary fuel mode towards a methanol-only primary fuel mode, the first fuel metering valve 116 is closed further while the second fuel metering valve 122 is opened further. The process continues until the first fuel metering valve 116 is closed while the second fuel metering valve 122 is opened, thereby abating the flow of the first fuel 104. The transition is illustrated in further detail in FIGS. 2-4, below.

Figure 2:
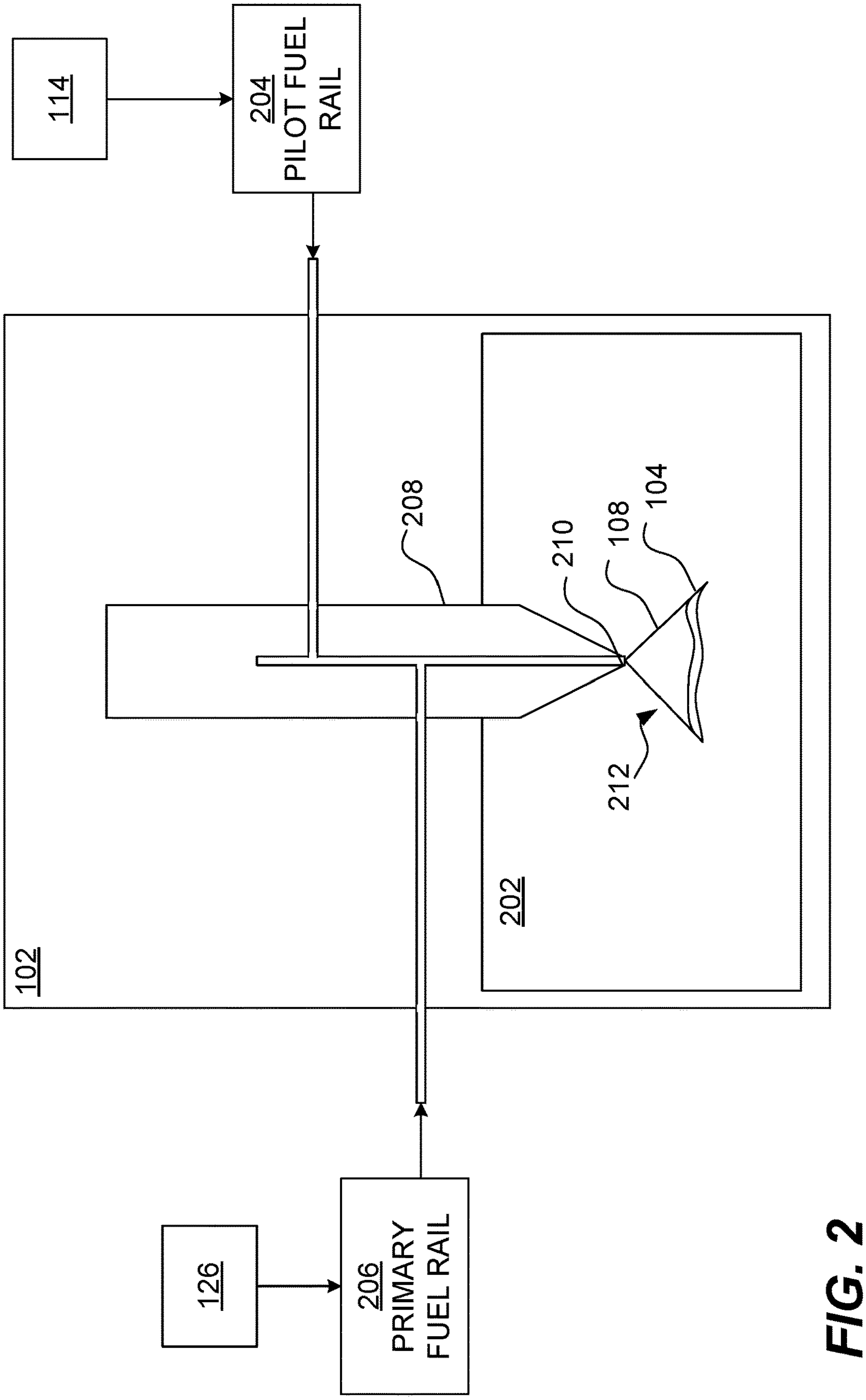
FIG. 2 is an illustration of a combustion chamber of an engine where a second fuel is the only component of a primary fuel, in accordance with some examples of the present disclosure.

FIG. 2 is an illustration of a combustion chamber 202 of the engine 102 where the second fuel 108 is the only component of a primary fuel, in accordance with some examples of the present disclosure. In this configuration, the first fuel metering valve 116 is closed and the second fuel metering valve 122 is positioned to control the flow of the second fuel 108 into the engine 102. In FIG. 2, the combustion chamber 202 receives the primary fuel and the pilot fuel and combusts those fuels to provide power. The primary fuel and the pilot fuel are compressed by a piston (not shown). In FIG. 2, the pilot fuel is provided through a pilot fuel rail 204. The first fuel 104 is pumped into the pilot fuel rail 204 through the block 114. The primary fuel is provided through a primary fuel rail 206. The second fuel 108 is pumped through the mixer 126 and into the primary fuel rail 206. As used herein, a “rail” is a fuel line that supplies fuel to one or more injectors, such as injector 208. It should be noted that injector 208 can be a single injector capable of receiving both the first fuel 104 and the second fuel 108 or multiple injectors with each capable of receiving either of the first fuel 104 or the second fuel 108, or combinations thereof. The injector 208 injects the pilot fuel (the first fuel 104) and the primary fuel (the second fuel 108) into the combustion chamber 202 through injector port 210. Injected fuel 212 is comprised of the initial burst of the pilot fuel (the first fuel 104) followed by a second burst of the primary fuel (the second fuel 108).

Figure 3:
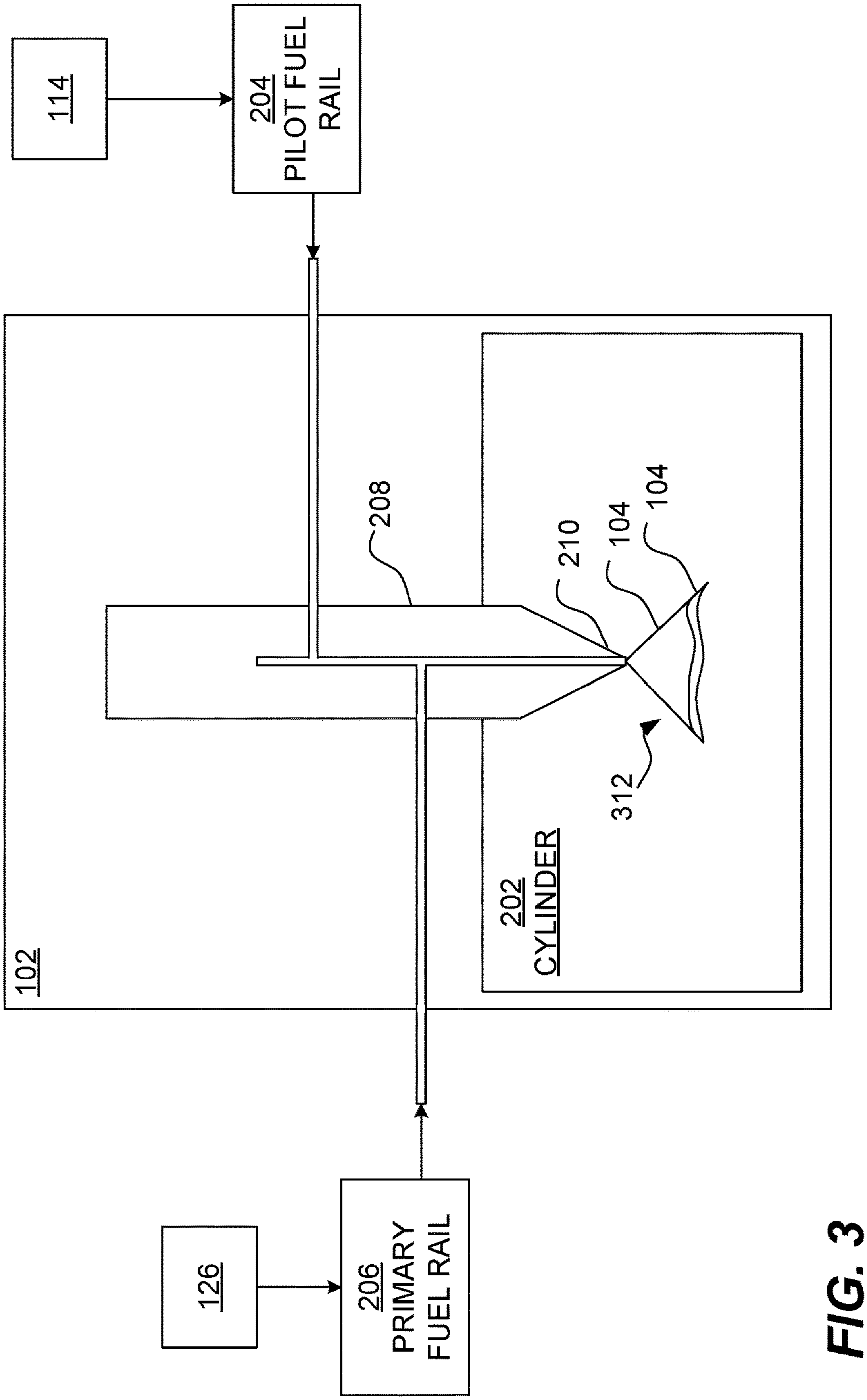
FIG. 3 is an illustration of a combustion chamber of an engine where a first fuel is the only component of a primary fuel, in accordance with some examples of the present disclosure.

FIG. 3 is an illustration of the combustion chamber 202 of the engine 102 where the first fuel 104 is the only component of the primary fuel, in accordance with some examples of the present disclosure. In this configuration, the first fuel metering valve 116 is positioned to control the flow of the first fuel 104 into the engine and the second fuel metering valve 122 is closed. The first fuel 104 is pumped into the pilot fuel rail 204 through the block 114. The primary fuel is provided through the primary fuel rail 206. The first fuel 104 is pumped through the mixer 126 and into the primary fuel rail 206. The injector 208 injects the pilot fuel (the first fuel 104) and the primary fuel (the first fuel 104) into the combustion chamber 202 through the injector port 210. Injected fuel 312 is comprised of the initial burst of the pilot fuel (the first fuel 104) followed by a second burst of the primary fuel (the first fuel 104). It should be noted that in some examples where the first fuel 104 is being used as the primary fuel, a controller (not shown) of the system 100 may stop or reduce the flow of the pilot fuel, as the first fuel 104 is configured to combust without the use of a pilot fuel.

Figure 4:
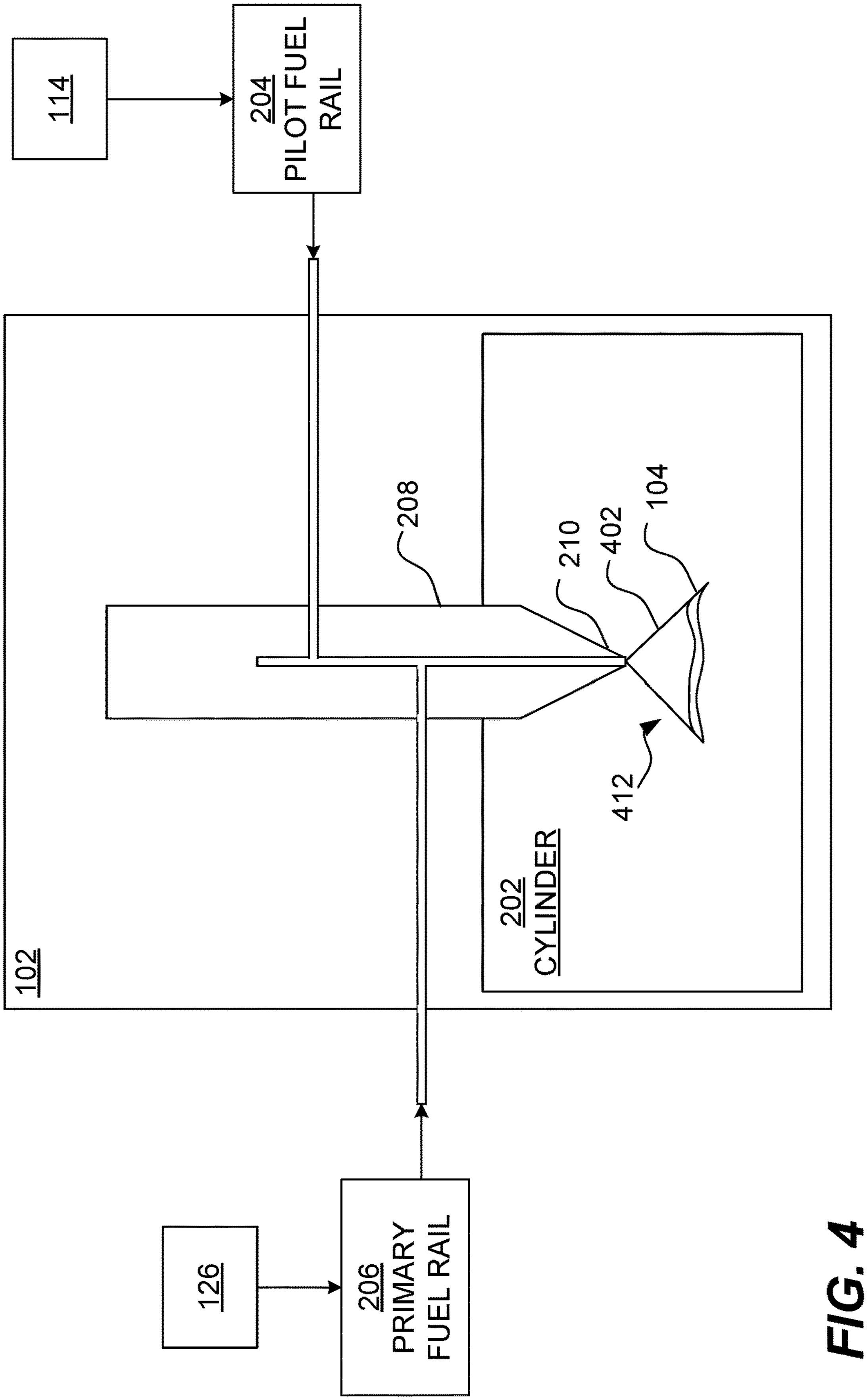
FIG. 4 is an illustration of a combustion chamber of an engine where a first fuel is mixed with a second fuel to create a fuel mixture, whereby the mixture is the primary fuel, in accordance with some examples of the present disclosure.

FIG. 4 is an illustration of the combustion chamber 202 of the engine 102 where the first fuel 104 is mixed with the second fuel 108 to create a fuel mixture, whereby the mixture is the primary fuel, in accordance with some examples of the present disclosure. In this configuration, the first fuel metering valve 116 is positioned to control the flow of the first fuel 104 into the engine and the second fuel metering valve 122 is positioned to control the flow of the second fuel 108 into the engine 102 through the mixer 126. The first fuel 104 is pumped into the pilot fuel rail 204 through the block 114, as well as, into the tee 118 through the block 114 and the first fuel metering valve 116. The second fuel 108 is pumped into the tee 118 through the second fuel metering valve 122. The first fuel 104 and the second fuel 108 are mixed in the mixer 126 and provided to the primary fuel rail 206, whereby the mixture (emulsion) is the primary fuel. The injector 208 injects the pilot fuel (the first fuel 104) and the primary fuel (a mixture 402 of the first fuel 104 and the second fuel 108) into the combustion chamber 202 through the injector port 210. Injected fuel 412 is comprised of the initial burst of the pilot fuel (the first fuel 104) followed by a second burst of the primary fuel (the mixture 402 of the first fuel 104 and the second fuel 108). It should be noted that in some examples where the first fuel 104 is being used as a component of the mixture 402 forming the primary fuel, the system 100 may stop or reduce the flow of the pilot fuel, as the first fuel 104 is configured to combust without the use of a pilot fuel.

As noted above, the positions of the first fuel metering valve 116 and the second fuel metering valve 122 determine the relative concentrations of the first fuel 104 and the second fuel 108 in the primary fuel added to the engine 102. The positions of these valves, the first fuel metering valve 116 and the second fuel metering valve 122, can be controlled based on various inputs. In one example, the power demand of the engine 102, indicated by a position of a control input such as an accelerator, can be used to determine the preferable relative concentrations of the first fuel 104 and the second fuel 108 in the primary fuel added to the engine 102. A controller may be used to change valve configurations, as illustrated in more detail in FIG. 5.

Figure 5:
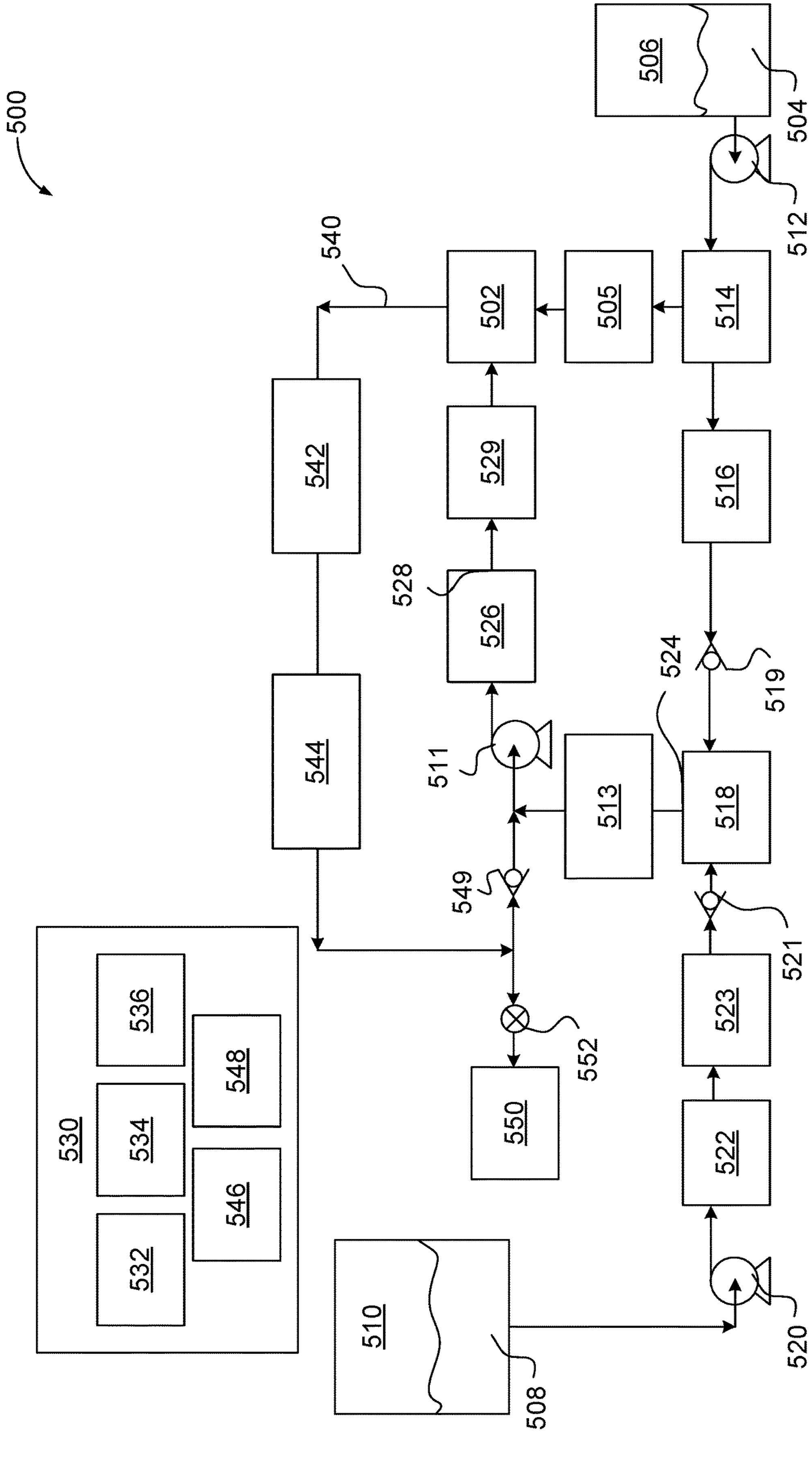
FIG. 5 is an illustration showing a combustion engine system that uses a controller to control relative concentrations of a first fuel and a second fuel in a primary fuel fed to an engine, in accordance with one or more examples of the present disclosure.

FIG. 5 is an illustration showing a combustion engine system 500 that uses a controller to control relative concentrations of a first fuel and a second fuel in a primary fuel fed to an engine 502, in accordance with one or more examples of the present disclosure. The system 500 includes the engine 502, which is an internal combustion engine. The engine 502 is fueled by a first fuel 504 stored in a first fuel tank 506, a second fuel 508 stored in a second fuel tank 510, or mixtures thereof. The first fuel 504 may include a higher cetane/lower octane liquid fuel, and the second fuel 508 may include a lower cetane/higher octane liquid fuel. The terms "higher" and "lower" in this context may be understood as relative terms in relation to one another. Thus, the first fuel 504 may have a higher cetane number and a lower octane number than a cetane number and an octane number of the second fuel 508. The second fuel 508 may include an alcohol fuel such as methanol or ethanol, Naphtha, for example, or still other fuel types. For the purposes of FIG. 5, the first fuel 504 is described as diesel fuel and the second fuel 508 is described as methanol, though as noted above, the presently disclosed subject matter may be used with other fuel types.

In some examples, the first fuel 504 may be used as a pilot fuel to the engine 502. The first fuel 504 is in fluidic communication with and is pumped by a first fuel pump 512 into block 514 and into a pilot fuel rail 505 of the engine 502 for use as a pilot fuel. The block 514 is generally a ported device that receives the first fuel 504 from the first fuel pump 512 and directs the first fuel 504 into the pilot fuel rail 505 of the engine 502 as the pilot fuel or to a first fuel metering valve 516 if the first fuel metering valve 516 is open, allowing fluid flow of the first fuel 504. The first fuel metering valve 516 prevents and throttles the flow of the first fuel 504 into a tee 518 through check valve 519.

A second fuel pump 520 is in fluidic communication with the second fuel 508 in the second fuel tank 510. The second fuel pump 520 pumps the second fuel 508 from the second fuel tank 510 into a second fuel metering valve 522. The second fuel metering valve 522 prevents and throttles the flow of the second fuel 508 into the tee 518 through check valve 521. A flowmeter 523 measures the flow of the second fuel 508 through the second fuel metering valve 522. Fluids entering the tee 518 exit a tee outlet 524 and enters a mixer 526. In some examples a mixture pump 511 may be used to provide additional motive force to the fluids exiting the tee 518 at the tee outlet 524. The mixer 526 is designed to mix fluids entering the mixer 526 to create an emulsification (or other mixture) of fluids entering the mixer 526. The fluids exiting the mixer are directed to a primary fuel rail 529 for use as the primary fuel for the engine 502. Depending on the volumetric flowrate of the one or more fluids entering the mixer 526, the mixer 526 can be a low-shear/high-flow mixer or a high-shear/low-flow mixer. In some examples, the mixer 526 is a liquid-liquid mixer, a gas-liquid mixer, or multiple combinations thereof. However, it should be noted that the presently disclosed subject matter is not limited to any particular type or number of mixers, as more than one type, different types, or multiple mixers may be used and are considered to be within the scope of the presently disclosed subject matter. A composition sensor 513 is used to measure the concentrations of the first fuel 504 and the second fuel 508 exiting the tee 518. In some examples, a flowmeter (not illustrated) may be used at the output of the first fuel metering valve 516 to measure the flow of the first fuel 504 entering the tee 518. The relative concentrations of the first fuel 504 and the second fuel 508 exiting the tee 518 may be calculated based on the measured volumetric flowrates of the first fuel 504 and the second fuel 508. In another example, the volumetric flowrates of the first fuel 504 and the second fuel 508 may be premeasured based on pump speeds and/or positions of their respective metering valves. These and other methods may be used to calculate the relative concentrations of the first fuel 504 and the second fuel 508 exiting the tee 518.

When the second fuel 508 is used as a primary fuel, an output 528 of the mixer 526 is primarily the second fuel 508. The second fuel pump 520 pumps the second fuel 508 from the second fuel tank 510 through the second fuel metering valve 122, the flowmeter 523, through check valve 521 and into the tee 518. In the configuration in which the second fuel 508 is the primary fuel, the tee outlet 524 of the tee 518 is the second fuel 508 because the first fuel metering valve 516 is closed, abating the flow of the first fuel 504 from the first fuel pump 512 out of the block 514 at the first fuel metering valve 516. The first fuel 504 flows out of the first fuel pump 512 through the block 514 and the pilot fuel rail 505 and into the engine 502 as a pilot fuel. When the first fuel 504 is used as a primary fuel, the output 528 of the mixer 526 is primarily the first fuel 504. The first fuel pump 512 pumps the first fuel 504 from the first fuel tank 506. In this example, because the first fuel 504 is being used as the primary fuel, the tee outlet 524 of the tee 518 is the first fuel 504 because the second fuel metering valve 522 is closed, abating the flow of the second fuel 508 from the second fuel pump 520 at the second fuel metering valve 522. In some examples where the first fuel 504 is used as the primary fuel, along with closing the second fuel metering valve 522, the second fuel pump 520 may also be deenergized.

Along with the configurations in which the second fuel 508 or the first fuel 504 is used as the primary fuel, the system 500 further includes a configuration in which the primary fuel may be a mixture (or emulsion) of the first fuel 504 and the second fuel 508. In these examples, as the engine power demand increases where the engine 502 transitions from the use of the second fuel 508 as the only primary fuel to the first fuel 504 as the only primary fuel, the first fuel 504 and the second fuel 508 may be mixed in various concentrations as the engine 502 moves through and back from the transition. For the configuration where the engine 502 transitions from the use of the second fuel 508 as the only primary fuel to the first fuel 504 as the only primary fuel, initially the first fuel metering valve 516 is closed and the second fuel metering valve 522 is throttled to control the volumetric flowrate of the second fuel 508 into the tee 518, the mixer 526, and eventually the engine 502 as the primary fuel.

To control or change the relative amount of the first fuel 504 and the second fuel 508 in the primary fuel, a controller 530 may be used. The controller 530 can be a component of an engine control unit (ECU), engine control module (ECM) ECU of an internal combustion engine, or another component used to control various aspects of an internal combustion engine. The controller 530 controls the amount of the primary fuel entering the primary fuel rail 529 as well as the concentrations of the first fuel 504 and the second fuel 508 in the primary fuel. The controller 530 includes one or more processors and memory storing therein instructions that, when executed by the processor of the controller 530, cause the controller 530 to control various components of the system 500. These and other aspects of the controller 530 are explained in more detail in FIG. 7, below.

To transition from the configuration in which the second fuel 508 is used as the primary fuel to the configuration in which the primary fuel comprises a mixture of the second fuel 508 and the first fuel 504, the controller 530 is configured to control the position of the first fuel metering valve 516 using first fuel control signal 532. The controller 530 is further configured to control the position of the second fuel metering valve 522 using second fuel control signal 534. The controller 530 uses an engine power demand input 536 to determine the desired or required positions of the second fuel metering valve 522 and the first fuel metering valve 516 for the engine power demand. As noted above, the second fuel 508 may only provide a maximum amount of power for a given system configuration. If the maximum amount of power is less than the full power achievable by the engine 102, the first fuel 504 may be added to the second fuel 508 to provide additional power.

As the power demand increases beyond the maximum amount of power the second fuel 508 may provide for a given system configuration, additional amounts of the first fuel 504 may need to be added, potentially to the point that the first fuel 504 is the sole component of the primary fuel. Therefore, the controller 530 uses the engine power demand input 536 to determine the desired relative amounts of the first fuel 504 and the second fuel 508 in the primary fuel. For example, assuming that the second fuel 508 as the sole component of the primary fuel can provide sixty percent (50%) of the potential maximum power of the engine 102, and the first fuel 504 can provide up to one hundred percent (100%) of the potential maximum power of the engine 102, achieving greater than 50% of the engine power requires the use of the first fuel 504 in combination with the second fuel 508 above power demand levels of 50%. The relative concentration changes can vary as the power demand levels increase. For example, the relative concentrations (or ratio of the volumetric flowrate of the second fuel to the volumetric flowrate of the first fuel) may go from 100:0 at a 50% power demand level, to 50:50 at a 75% power demand level, and onto a 0:100 at a 100% power demand level. It should be noted that these ratios are used to merely demonstrate how the ratio changes based on power demand level and should not be considered as limiting the presently disclosed subject matter. The controller 530 may additionally use a composition input 548, which reflects the concentrations of the first fuel 504 and the second fuel 508 exiting the tee 518, received from the composition sensor 513 (if used) to further adjust the positions of the second fuel metering valve 522 and the first fuel metering valve 516.

To increase the amount of the first fuel 504 added to the primary fuel, the controller 530 issues the first fuel control signal 532 to open the first fuel metering valve 516 to a position increasing the flow of the first fuel 504 through the first fuel metering valve 516. Further, if needed to maintain or achieve a particular total volumetric flowrate of the primary fuel entering the engine 102, the controller 530) issues the second fuel control signal 534 to close or open the second fuel metering valve 522. To decrease the amount of the first fuel 504 added to the primary fuel, the controller 530 issues the first fuel control signal 532 to close the first fuel metering valve 516 to a position and, if needed to maintain or achieve a particular total volumetric flowrate of the primary fuel entering the engine 102, the second fuel control signal 534 to close or open the second fuel metering valve 522. It should be understood that the use of a throttle valve is merely for purposes of providing an example, as other technologies for controlling the volumetric flowrate of the first fuel 504, including variable speed pumps, may be used and are considered to be within the scope of the presently disclosed subject matter.

In some examples, not all of the primary fuel may be used by the engine 502. In these examples, excess primary fuel 540, which is uncombusted primary fuel that is not injected into a combustion chamber of the engine 502, may need to be recirculated back into the engine 502 or stored in a tank. In FIG. 5, because the primary fuel may be at a higher temperature, the excess primary fuel 540) from the engine 502 enters a cooler 542. The cooler 542 reduces a temperature of, or cools, the excess primary fuel 540). The excess primary fuel 540) leaves the cooler 542 and enters a flowmeter 544 that measures the volumetric flowrate of the excess primary fuel 540) and outputs excess flowrate signal 546 to the controller 530. If the flowrate exceeds a setpoint, the controller 530 can issue an updated first fuel control signal 532 to reduce the flowrate of the first fuel 504 and an updated second fuel control signal 534 to reduce the flowrate of the second fuel 508 entering the mixer 526. The mixture pump 511 may be used to pull at least a portion of the excess primary fuel 540 back to the mixer 526 through check valve 549. Additional excess primary fuel 540) may be stored in a mixture tank 550 by opening mix tank valve 552.

Figure 6:
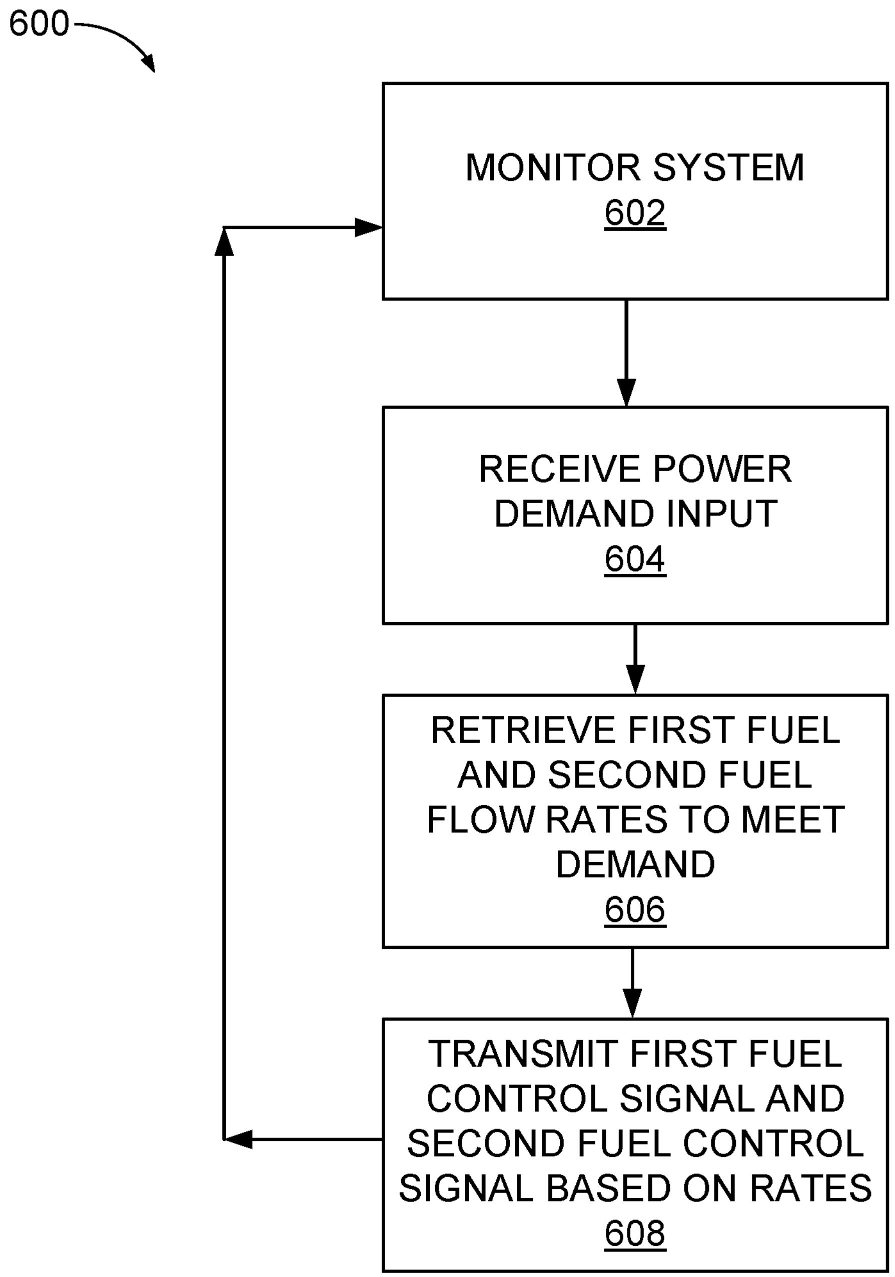
FIG. 6 illustrates a method for operating an internal combustion engine in which a controller controls the relative amounts of a first fuel and a second fuel in the primary fuel, in accordance with various examples of the presently disclosed subject matter.

FIG. 6 illustrates a method 600 for operating the internal combustion engine 502 in which the controller 530 controls the relative amounts of the first fuel 504 and the second fuel 508 in the primary fuel, in accordance with various examples of the presently disclosed subject matter. The method 600 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 600 commences at step 602, where the controller 530 is monitoring the system 500. At step 602, the controller 530 is in operation and receiving various inputs, such as, but not limited to, the engine power demand input 536, the excess flowrate signal 546, and the composition input 548. The various inputs are used by the controller 530 to control the flowrates of the first fuel 504 and the second fuel 508 into the engine 502.

At step 604, the controller 530 receives an updated engine power demand input 536. The engine power demand input 536 is a communication to the controller 530 informing the controller 530 of a desired power demand of the engine 502. Although not limited to any particular source, the engine power demand input 536 can be generated and received from various sensors or inputs associated with the engine 502, including an engine control unit (ECU), engine control module (ECM) ECU of an internal combustion engine, or another component used to control various aspects of an internal combustion engine.

At step 606, the controller 530 retrieves first fuel 504 and second fuel 508 flowrates to meet the demand. Although not limited to any particular source for the first fuel 504 and second fuel 508 flowrates, in some examples, an engine map may be accessed by the controller 530. As used herein, an "engine map" is a set of data that provides various engine settings, such as the first fuel 504 and second fuel 508 flowrates, to achieve one or more desired engine outputs (e.g., torque or power). Therefore, the controller 530 uses the engine power demand input 536 to determine the desired relative amounts of the first fuel 504 and the second fuel 508 in the primary fuel using data such as an engine map. For example, an engine map may have a table that at an 80% power demand, the flowrate of the first fuel 504 should be 265 ml/min and the flowrate of the second fuel 508 should be 265 ml/min. The controller 530 has stored therein or access to settings of the first fuel metering valve 516 and the second fuel metering valve 522 to achieve those respective flowrates.

At step 608, the controller 530 transmits the first fuel control signal 532 to the first fuel metering valve 516 to cause the first fuel metering valve 516 to adjust to the position to achieve the first fuel flowrate based on the first fuel control signal 532. Similarly, the controller 530 transmits the second fuel control signal 534 to the second fuel metering valve 522 to cause the second fuel metering valve 522 to adjust to the position to achieve the second fuel flowrate based on the second fuel control signal 534. As the first fuel 504 and the second fuel 508 flow through the tee 518, the first fuel 504 and the second fuel 508 flow are eventually mixed in the mixer 526 for delivery to the engine 502 as the primary fuel.

Figure 7:
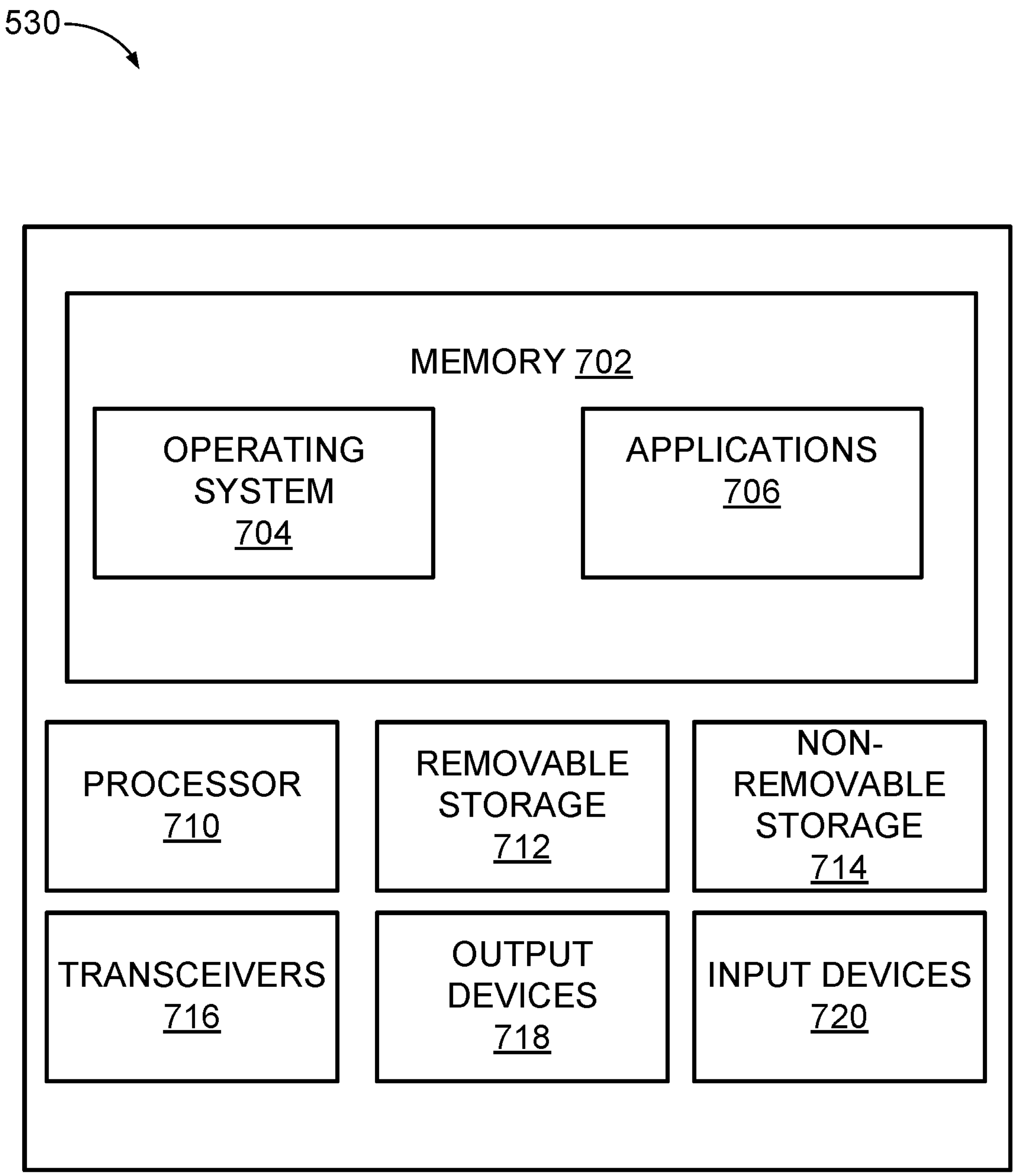
FIG. 7 depicts a component level view of a controller for use with the systems and methods described herein, in accordance with various examples of the presently disclosed subject matter.

FIG. 7 depicts a component level view of the controller 530 for use with the systems and methods described herein, in accordance with various examples of the presently disclosed subject matter. The controller 530 could be any device capable of providing the functionality associated with the systems and methods described herein. The controller 530 can comprise several components to execute the above-mentioned functions. The controller 530 may be comprised of hardware, software, or various combinations thereof. As discussed below, the controller 530 can comprise memory 702 including an operating system (OS) 704 and one or more standard applications 706. The standard applications 706 may include applications that provide for the first fuel control signal 532, the second fuel control signal 534, as well as, receiving and storing signals such as the engine power demand input 536 and the excess flowrate signal 546.

The controller 530 can also comprise one or more processors 710 and one or more of removable storage 712, non-removable storage 714, transceiver(s) 716, output device(s) 718, and input device(s) 720. In various implementations, the memory 702 can be volatile (such as random access memory (RAM)), non-volatile (such as read only memory (ROM), flash memory, etc.), or some combination of the two. The memory 702 can include data pertaining to signals such as the engine power demand input 536 and the excess flowrate signal 546, and other information, and can be stored on a remote server or a cloud of servers accessible by the controller 530.

The memory 702 can also include the OS 704. The OS 704 varies depending on the manufacturer of the controller 530. The OS 704 contains the modules and software that support basic functions of the controller 530, such as scheduling tasks, executing applications, and controlling peripherals. The OS 704 can also enable the controller 530 to send and retrieve other data and perform other functions, such as the engine power demand input 536 and the excess flowrate signal 546, as well as instructions the first fuel control signal 532, and the second fuel control signal 534.

The controller 530 can also comprise one or more processors 710. In some implementations, the processor(s) 710 can be one or more central processing units (CPUs), graphics processing units (GPUs), both CPU and GPU, or any other combinations and numbers of processing units. The controller 530 may also include additional data storage devices (removable and/or non-removable) such as, for example, magnetic disks, optical disks, or tape. Such additional storage is illustrated in FIG. 7 by removable storage 712 and non-removable storage 714.

Non-transitory computer-readable media may include volatile and nonvolatile, removable and non-removable tangible, physical media implemented in technology for storage of information, such as computer readable instructions, data structures, program modules, or other data. The memory 702, removable storage 712, and non-removable storage 714 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 530. Any such non-transitory computer-readable media may be part of the controller 530 or may be a separate database, databank, remote server, or cloud-based server.

In some implementations, the transceiver(s) 716 include any transceivers known in the art. In some examples, the transceiver(s) 716 can include wireless modem(s) to facilitate wireless connectivity with other components (e.g., between the controller 530 and one or more pumps or valves), the Internet, and/or an intranet. Specifically, the transceiver(s) 716 can include one or more transceivers that can enable the controller 530 to send and receive data. Thus, the transceiver(s) 716 can include multiple single-channel transceivers or a multi-frequency, multi-channel transceiver to enable the controller 530 to send and receive video calls, audio calls, messaging, etc. The transceiver(s) 716 can enable the controller 530 to connect to multiple networks including, but not limited to 2G, 3G, 4G, 5G, and Wi-Fi networks. The transceiver(s) 716 can also include one or more transceivers to enable the controller 530 to connect to future (e.g., 6G) networks, Internet-of-Things (IoT), machine-to machine (M2M), and other current and future networks.

The transceiver(s) 716 may also include one or more radio transceivers that perform the function of transmitting and receiving radio frequency communications via an antenna (e.g., Wi-Fi or Bluetooth®). In other examples, the transceiver(s) 716 may include wired communication components, such as a wired modem or Ethernet port, for communicating via one or more wired networks. The transceiver(s) 716 can enable the controller 530 to facilitate audio and video calls, download files, access web applications, and provide other communications associated with the systems and methods, described above.

In some implementations, the output device(s) 718 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 718 can also include speakers, or similar devices, to play sounds or ringtones when an audio call or video call is received. Output device(s) 718 can also include ports for one or more peripheral devices, such as headphones, peripheral speakers, or a peripheral display.

In various implementations, input device(s) 720 include any input devices known in the art. For example, the input device(s) 720 may include a camera, a microphone, or a key board/keypad. The input device(s) 720 can include a touch-sensitive display or a keyboard to enable users to enter data and make requests and receive responses via web applications (e.g., in a web browser), make audio and video calls, and use the standard applications 706, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 720 and an output device 718.

INDUSTRIAL APPLICABILITY

The present disclosure relates generally to internal combustion engines that use a mixer, such as the mixers 126 or 526, to mix a first fuel (e.g., diesel) with a second fuel (e.g., methanol) to provide for a transition from the maximum power provided by using only the second fuel to the maximum power provided by using only the first fuel. In some engines, such as the engine 102 or 502, the second fuel, such as methanol, is used to achieve performance and/or environmental improvements over the use of the first fuel, such as diesel. However, the energy content of a fuel like methanol can be one or two time less than the energy content of diesel. Thus, in some systems, the flowrate of methanol may not be sufficient to provide a certain power demand. There may be a power demand gap between the maximum power available using the second fuel and the maximum power available using the first fuel.

The systems 100 and 500 described herein provide for a transition from the maximum second fuel 508 power available and a given power demand above that maximum power. Rather than switching from the second fuel 508 to the first fuel 504 when a power demand exceeds that maximum power, to maintain at least a portion of the benefits of using the second fuel 508, the systems 100 and 500 use a mixer that mixes the first fuel 504 with the second fuel 508. The ratio of the second fuel to the first fuel in the mixture changes as the power demand changes, with the concentration of the second fuel 508 decreasing relative to the concentration of the first fuel 504 as the power demand increases and increasing relative to the concentration of the first fuel 504 as the power demand decreases. Thus, in some examples, rather than removing the desired performance and/or environmental benefits achieved by using the second fuel, the systems 100 and 500 allow the use of at least a portion of the second fuel 508 in the primary fuel.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A: B: C: A and B: A and C: B and C: A, B, and C: or multiple of any item such as A and A: B, B, and C: A, A, B, C, and C: etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:

an internal combustion engine that combusts a primary fuel and a pilot fuel;

a first fuel tank for storing a first fuel;

a second fuel tank for storing a second fuel;

a first fuel metering valve for controlling a first fuel flowrate of the first fuel exiting the first fuel tank;

a second fuel metering valve for controlling a second fuel flowrate of the second fuel exiting the second fuel tank; and a mixer configured to receive the first fuel via the first fuel metering valve and the second fuel via the second fuel metering valve, and to output a mixture of the received first fuel and second fuel to a primary fuel rail for use by the engine as the primary fuel, wherein a position of the first fuel metering valve determines a concentration of the first fuel in the primary fuel output by the mixer, a position of the second fuel metering valve determines a concentration of the second fuel in the primary fuel, and at least a portion of the first fuel is directed from the first fuel tank to the engine for use as the pilot fuel.

2. The system of claim 1, further comprising:

a first fuel pump in fluidic communication with the first fuel, wherein the first fuel pump pumps the first fuel from the first fuel tank to a block;

the block having internal ports for directing a first portion of the first fuel to a pilot fuel rail, wherein the first portion of the first fuel is the pilot fuel for use by the engine, and wherein a second portion of the first fuel is directed to the first fuel metering valve; and a second fuel pump in fluidic communication with the second fuel in the second fuel tank, wherein the second fuel pump pumps the second fuel into a tee.

3. The system of claim 1, further comprising:

a first fuel metering valve for measuring a flow of the first fuel through the first fuel metering valve; and a second fuel flowmeter for measuring a flow of the second fuel through the second fuel metering valve.

4. The system of claim 1, further comprising a composition sensor configured to measure a concentration of the first fuel and a concentration of the second fuel in the mixer output.

5. The system of claim 1, further comprising:

a cooler for cooling an excess primary fuel, wherein the excess primary fuel is uncombusted primary fuel not injected into a combustion chamber of the engine;

an excess primary fuel flowmeter for measuring a flowrate of the excess primary fuel;

a mixture pump for pumping at least a portion of the excess primary fuel and the output of a tee into the mixer; and a mixture tank for receiving and storing the excess primary fuel not pumped back into the mixer.

6. The system of claim 1, further comprising a controller, the controller comprising:

a memory storing computer-executable instructions; and a processor in communication with the memory, the computer-executable instructions causing the processor to perform acts comprising:

monitoring the system;

receiving a power demand input;

retrieving a first fuel flowrate and retrieving a second fuel flowrate from an engine map based on the power demand input;

issuing a first fuel control signal to the first fuel metering valve to cause the first fuel metering valve to adjust to a first fuel metering valve position to achieve the first fuel flowrate; and issuing a second fuel control signal to the second fuel metering valve to cause the second fuel metering valve to adjust a second fuel metering valve position to the position based on the second fuel control signal.

7. The system of claim 6, wherein the controller further comprises computer-executable instructions that cause the processor to perform acts comprising:

receiving a composition input indicating a concentration of the first fuel and a concentration of the second fuel in the output of a tee; and adjusting the first fuel metering valve position or a second fuel metering valve position to achieve the first fuel flowrate and the second fuel flowrate.

8. The system of claim 6, wherein the first fuel flowrate and the second fuel flowrate transitions from:

a first configuration wherein the second fuel is a sole component of the primary fuel;

a second configuration wherein the first fuel and the second fuel are mixed in the mixer as the primary fuel, wherein the primary fuel comprises an emulsion of the first fuel and the second fuel; and a third configuration wherein the first fuel is the sole component of the primary fuel.

9. The system of claim 1, wherein the mixer comprises a low-shear/high-flow mixer or comprises a high-shear/low-flow mixer.

10. The system of claim 1, wherein the mixer comprises a liquid-liquid mixer or a gas-liquid mixer.

11. A method of operating a system, the method comprising:

monitoring, by a controller, the system, the system comprising:

an internal combustion engine that combusts a primary fuel and a pilot fuel;

a first fuel tank for storing a first fuel;

a second fuel tank for storing a second fuel;

a first fuel metering valve for controlling a first fuel flowrate of the first fuel exiting the first fuel tank;

a second fuel metering valve for controlling a second fuel flowrate of the second fuel exiting the second fuel tank; and a mixer configured to receive the first fuel via the first fuel metering valve and the second fuel via the second fuel metering valve, and to output a mixture of the received first fuel and second fuel to a primary fuel rail for use by the engine as the primary fuel, wherein a position of the first fuel metering valve determines a concentration of the first fuel in the primary fuel output by the mixer, a position of the second fuel metering valve determines a concentration of the second fuel in the primary fuel, and at least a portion of the first fuel is directed from the first fuel tank to the engine for use as the pilot fuel; and receiving, by the controller, a power demand input;

retrieving, by the controller, a first fuel flowrate and retrieving a second fuel flowrate from an engine map based on the power demand input;

issuing, by the controller, a first fuel control signal to the first fuel metering valve to cause the first fuel metering valve to adjust to a first fuel metering valve position to achieve the first fuel flowrate; and issuing, by the controller, a second fuel control signal to the second fuel metering valve to cause the second fuel metering valve to adjust a second fuel metering valve position to the position based on the second fuel control signal.

12. The method of claim 11, further comprising:

receiving, by the controller, a composition input indicating a concentration of the first fuel and a concentration of the second fuel in the output of a tee; and adjusting, by the controller, the first fuel metering valve position or a second fuel metering valve position to achieve the first fuel flowrate and the second fuel flowrate.

13. The method of claim 11, wherein the first fuel flowrate and the second fuel flowrate transitions from:

a first configuration wherein the second fuel is a sole component of the primary fuel;

a second configuration wherein the first fuel and the second fuel are mixed in the mixer as the primary fuel, wherein the primary fuel comprises an emulsion of the first fuel and the second fuel; and a third configuration wherein the first fuel is the sole component of the primary fuel.

14. The method of claim 11, further comprising:

measuring a flow of the first fuel through the first fuel metering valve; and measuring a flow of the second fuel through the second fuel metering valve.

15. The method of claim 11, further comprising measuring a concentration of the first fuel and a concentration of the second fuel in the mixer output.

16. The method of claim 11, further comprising:

cooling an excess primary fuel, wherein the excess primary fuel is uncombusted primary fuel not injected into a combustion chamber of the engine;

measuring a flowrate of the excess primary fuel;

pumping at least a portion of the excess primary fuel and the output of a tee into the mixer; and receiving and storing the excess primary fuel not pumped back into the mixer into a mixture tank.

17. A controller, the controller comprising:

a memory storing computer-executable instructions; and a processor in communication with the memory, the computer-executable instructions causing the processor to perform acts comprising:

monitoring, a system, the system comprising:

an internal combustion engine that combusts a primary fuel and a pilot fuel;

a first fuel tank for storing a first fuel;

a second fuel tank for storing a second fuel;

a first fuel metering valve for controlling a first fuel flowrate of the first fuel exiting the first fuel tank;

a second fuel metering valve for controlling a second fuel flowrate of the second fuel exiting the second fuel tank; and a mixer configured to receive the first fuel via the first fuel metering valve and the second fuel via the second fuel metering valve, and to output a mixture of the received first fuel and second fuel to a primary fuel rail for use by the engine as the primary fuel, wherein a position of the first fuel metering valve determines a concentration of the first fuel in the primary fuel output by the mixer, a position of the second fuel metering valve determines a concentration of the second fuel in the primary fuel, and at least a portion of the first fuel is directed from the first fuel tank to the engine for use as the pilot fuel; and receiving a power demand input;

retrieving a first fuel flowrate and retrieving a second fuel flowrate from an engine map based on the power demand input;

issuing a first fuel control signal to the first fuel metering valve to cause the first fuel metering valve to adjust to a first fuel metering valve position to achieve the first fuel flowrate; and issuing a second fuel control signal to the second fuel metering valve to cause the second fuel metering valve to adjust a second fuel metering valve position to the position based on the second fuel control signal.

18. The controller of claim 17, wherein the controller further comprises computer-executable instructions that cause the processor to perform acts comprising:

receiving a composition input indicating a concentration of the first fuel and a concentration of the second fuel in the output of a tee; and adjusting the first fuel metering valve position or a second fuel metering valve position to achieve the first fuel flowrate and the second fuel flowrate.

19. The controller of claim 17, wherein the first fuel flowrate and the second fuel flowrate transitions from:

a first configuration wherein the second fuel is a sole component of the primary fuel;

a second configuration wherein the first fuel and the second fuel are mixed in the mixer as the primary fuel, wherein the primary fuel comprises an emulsion of the first fuel and the second fuel; and a third configuration wherein the first fuel is the sole component of the primary fuel.

20. The controller of claim 17, wherein the controller further comprises computer-executable instructions that cause the processor to perform acts comprising:

receiving an excess flowrate signal indicating a flowrate of excess primary fuel, wherein the excess primary fuel is uncombusted primary fuel not injected into a combustion chamber of the engine; and issuing an updated first fuel control signal to the first fuel metering valve and an updated second fuel control signal to the second fuel metering valve to reduce the flowrate of the excess primary fuel.

* * * * *